United States Patent [19]

Chika

[11] 4,145,125

[45] Mar. 20, 1979

[54] EYEGLASS LENS WITH INDICIA AND METHOD OF MAKING SAME

[76] Inventor: Hani Chika, 2975 Laurel St., #16, San Diego, Calif. 92104

[21] Appl. No.: 817,232

[22] Filed: Jul. 20, 1977

[51] Int. Cl.² .......................... G02C 7/02; G02C 7/10
[52] U.S. Cl. ........................................... 351/165; 8/8; D16/72
[58] Field of Search .................. D16/52, 72; 351/163, 351/165, 51; 427/282; 8/8

[56] References Cited

U.S. PATENT DOCUMENTS

| D. 235,479 | 6/1975 | Canato | D16/52 |
| 2,354,772 | 8/1944 | Prange | 351/51 |

OTHER PUBLICATIONS

Tura Inc. advert, *Optometric Weekly*, Jan. 27, 1977, no page number.

*Primary Examiner*—John K. Corbin
*Assistant Examiner*—Scott J. Sugarman
*Attorney, Agent, or Firm*—Ralph S. Branscomb

[57] ABSTRACT

Eyeglass lenses ordinarily of the plastic, or hard resin, type which are tinted by means of a deep penetrating dye which becomes part of the molecular structure of the lens, are masked prior to being dipped into the dye solution to produce along a margin displaced from the optical center of the lens indicia such as the name of the wearer, or some other figure or symbol.

8 Claims, 9 Drawing Figures

EYEGLASS LENS WITH INDICIA AND METHOD OF MAKING SAME

BACKGROUND OF THE INVENTION

Over the last several years the field of optometrics has gone through a number of technological advances including the development of contact lenses, then soft contact lenses, plastic lenses which have a great weight advantage over ordinary glasses, as well as a number of changes in frame styling beginning with wire rims 15 or so years ago which have changed the previously drab and unattractive appearance of corrective glasses into what can be quite a glamorous personal asset. Currently the most glamorous and newest development in eyeglass technology and fashion are the progressively tinted plastic or hard resin lenses which are clear at the bottom and become progressively darker toward the top.

These lenses are known as plastic, hard resin, or "CR-39" plastic lenses, and are tinted by molecular catalytic dyes which actually penetrate deep within the lens, frequently all the way to the center, when the lenses are dipped in heated vats of the dyes. The lenses may be dyed any of a variety of colors and the depths to which the dye sinks, and thus the darkness achieved by the dye, depends primarily on the length of time which the lens is submerged.

SUMMARY OF THE INVENTION

The present invention is in part disclosed in Disclosure Document No. 059693, filed Apr. 7, 1977 and utilizes available plastic lens dying techniques and incorporates a step of masking to produce clear areas in the lens which spell the name of the wearer, or other catch words, or form a design. The masking can be done with tape which is capable of withstanding the temperatures of the dyes, or it can be written onto the lenses with a special masking compound, such as heat resistant glue or other adhesive compound which can later be dissolved by an appropriate solvent, but which in any event serves the purpose of preventing the dye from reaching and being absorbed by portions of the lens as the remaining portions darken.

BRIEF DESCRIPTIONS OF THE DRAWINGS

DETAILED DESCRIPTION OF THE PREFERRED EMBODIMENT

Figure 1:
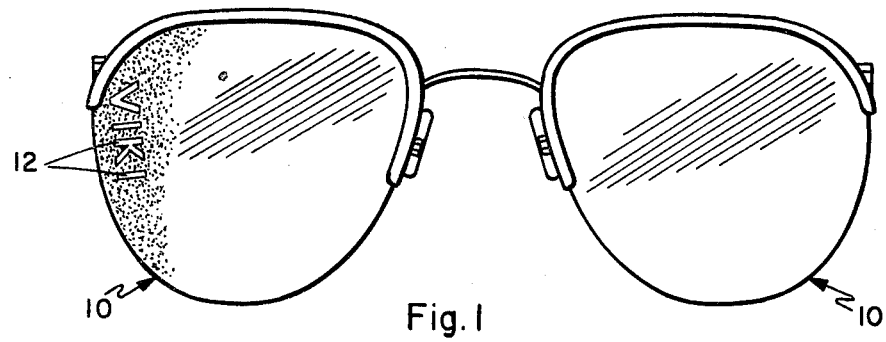
FIG. 1 is a front elevation view of a typical pair of eyeglasses showing the name VIKI on one lens.
Figure 2:
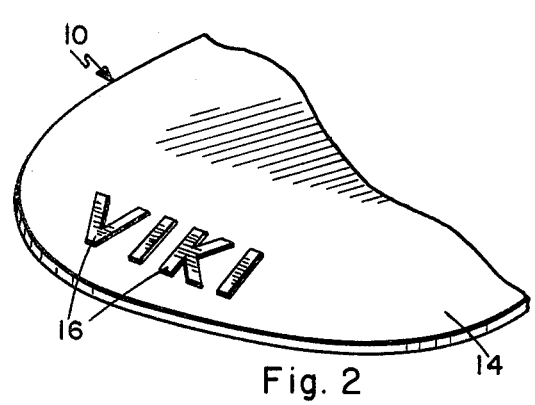
FIG. 2 is a perspective of a portion of a lens having masking tape thereon for dying purposes.
Figure 3:
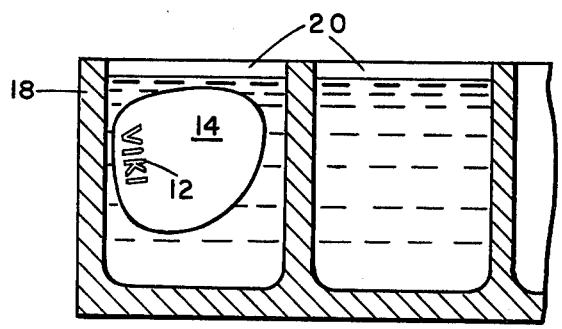
FIG. 3 is a diagrammatic illustration of a lens having masking thereon being dipped in a vat of dye.
Figure 4:
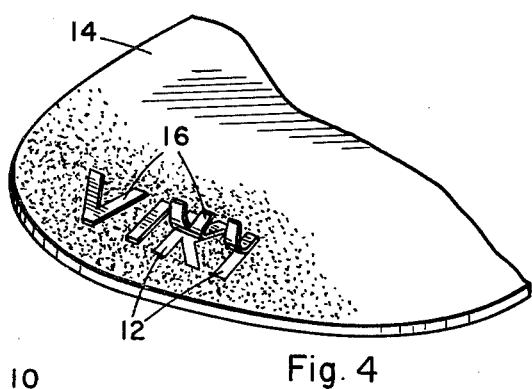
FIG. 4 illustrates the masking tape being peeled off subsequent to the dying.

One example of a finished product is shown in FIG. 1 wherein a lens tint is shown in a typical pair of eyeglasses, this lens having first portions 12 which are clear at least on one side of the lens and spell the name VIKI. These first portions of the lens are defined by the surrounding secondary portion 14 of the lens which has been dyed so that the first portions 12 stand out in contrast.

Figure 6:
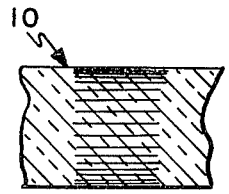
FIG. 6 is a section taken along lines 6—6 of FIG. 5 illustrating the depths of penetration of dye.

These lenses ordinarily would be of the plastic or hard resin variety and are dyed by being dipped into a vat of molecular catalytic dye which is heated to a temperature of between 170° and 212° F. The dye sinks into the lens itself as shown in FIG. 6, ordinarily reaching the center of the lens although not always, depending on the length of time the lens is submerged. Graduated darkness lenses are of course made by dipping progressive levels of the lens into the dye for different lengths of time.

This process is the one used to dye the lenses described herein. In order to define the indicia at 12, masking material 16, such as a tape capable of withstanding the dye temperatures and being impervious to the dye, is arranged over the lens surface according to the design desired. The dying process is ordinarily accomplished in a multi-compartmented vat 18, the multiple compartments 20 being used for several dipping procedures. Typically, these would include a first dipping in a cleaning or solvent compound such as acetone which will not harm the plastic lens material, although many other types of plastic would be melted. This step cleans any film layer from the lens and leaves it ready for dying.

At this point the masking material is carefully arranged on the lens so as not to smudge the acetone-cleaned surface and the lens is dipped into the dye. After the appropriate interval of submersion has passed, the lens is removed from the hot dye solution and immediately submerged into a preparatory soap solution to dissolve the excess dye on the lens surface so that it will not run onto the transparent areas. After this step, the masking tape is peeled from the lens, and in the event some adhesive remains on the lens it is re-dipped into the acetone and emerges perfectly clean with the tape adhesive dissolved away.

In a slight variation of this technique, a complementary layer of masking material could be placed on the bottom of the lens opposite the masking on the upper surface to produce an image that is completely clear from top to bottom. Masking on one side only produces a quite discernable image, but of course it is not clear completely through the lens.

Figure 5:
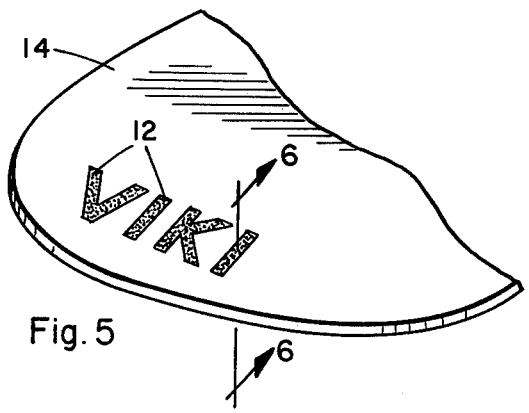
FIG. 5 illustrates a portion of a lens in which the majority of the lens was masked prior to dipping, exposing only the letters of the name VIKI.

In the embodiment shown thus far, the indicia or design incorporated on the lens margin will be clear and surrounded by a dark, tinted lens. The inverse of this proposition could also be effected wherein all of the lens is masked except for those portions 12 which represent the indicia. This is shown in FIG. 5. In this embodiment the lens is light except for the portions 12 which have been darkened by masking the remainder of the lens. Naturally, the entire lens could have had a light tinting of dye prior to the further darkening of the desired indicia so that two shades of color would be used.

FIG. 6 is a cross section taken through one of the indicia portions 12 illustrating the fact that the dye used with these lenses sinks deep down into the lens, often to the center.

Figure 7:
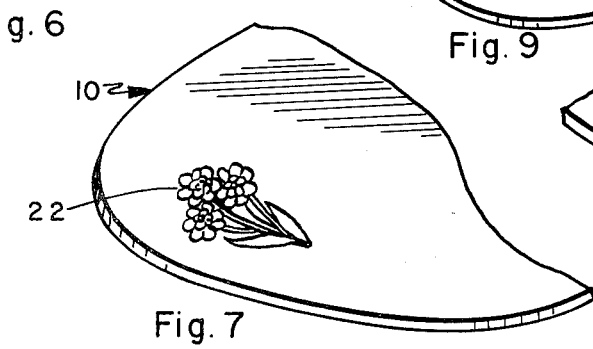
FIG. 7 is a perspective of a portion of a lens having a decorative floral display thereon.

A modified form of the indicia which is possible in the embodiments shown is illustrated in FIG. 7. The flowers shown at 22 could be made by any masking process, such as by drawing the flowers on with a suitable glue which can withstand boiling temperatures and is not soluble in the dye solution but can be removed subsequent to the dipping operation with acetone or the like. Silicon rubber sealing compound is a good example.

Figure 8:
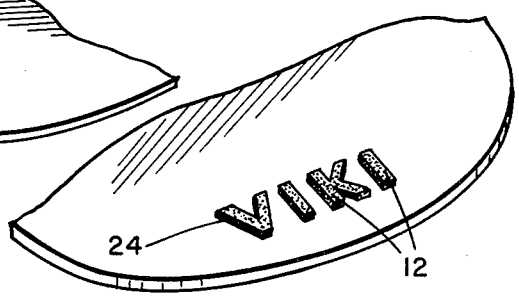
FIG. 8 illustrates a two-color tinting arrangement.

More than one color could be included in the same lens, or different shades of the same color by alternately masking and dipping in different color dyes, or in the same dye repeatedly following masking of different areas of the lens. One exemplary effect which can be achieved by this procedure is shown in FIG. 8 wherein the first portions of the lens 12 are provided in a light gray, for example, and other portions or areas 24 of the lens are dyed darker than the areas 12 so that a block, or three-dimensional effect is created. Of course, different colors and different tones could be used to achieve any colorful effect, and need not be restricted to the stylized lettering represented in FIG. 8.

Figure 9:
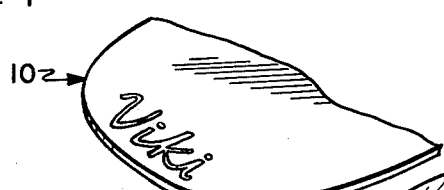
FIG. 9 illustrates a name written on the lens in script with masking glue as opposed to the block-lettered tape masked version.

Yet another slight modification of the masking procedure could be used as follows. In order to incorporate for example an image of the owner's face on the edge of the lens, the face could be sketched directly on the masking tape, or made large and reduced onto tape, and the tape then cut away to leave the features of the face intact, and the lens masked in the usual manner. This could be done in two or more stages for different color separations similar to the method used in two or three color printing. Also, the actual signature of the owner of the glasses could be incorporated on the lens either by the immediately above mentioned masking tape silhouette process, or by writing directly on the lens with a pen or the like filled with diluted silicone rubber sealing compound, mentioned above, or other fluid masking medium. See FIG. 9.

If during the process of formation of the indicia the operator makes a mistake, there are bleaches available which safely and effectively bleach out the entire lens to its original clear mode so that the entire process can be attempted again. Also, at any point in time the lenses can be re-dipped to deepen the color, or to change the color, or to add new colors, etc., so that the owners of the eyeglasses would not be permanently stuck with a design he tired of.

The lenses described herein have a number of advantageous features compared to plain lenses, or lenses that have been etched or have inlaid, simulated diamonds. As opposed to etchings or other means of creating indicia on the lens, the instant method provides no opaque places and thus does not impair peripheral vision. No pits or etching of the glass is required which would tend to weaken the glass and risk cracking the lens during the etching or pitting process. The most important safety feature, as just mentioned above, is that no opaque material is added to the lens. The wearer of the lenses is not aware of the design, which is far removed from the optical center of the lens, and ordinarily, in the case of lenses having an overall tint, would not be able to see the lens design even if looking at it.

The design as viewed by those other than the wearer appears stylish and fashionable, and also serves to identify the glasses in case they are lost. Both first and last names of the wearer could of course be incorporated on the outer edges of the two lenses.

I claim:
1. An eyeglass lens comprising:
   (a) a body made of a synthetic material;
   (b) said body having a first portion and a second portion, at least one of said portions having dye deeply absorbed therein and being visually distinct from the other of said portions;
   (c) said first portion being adjacent the periphery of said lens and being substantially surrounded by said second portion such as to define a substantially integral indicia-forming area on said lens which is generally imperceptible to the wearer of said lens but visible to observers as decorative or identifying indicia.

2. A lens according to claim 1 wherein said lens body has two faces and said first portion has at least one clear face and said second portion comprises lens material having absorbed dye therein.

3. A lens according to claim 1 and including at least one additional lens portion in addition to and visually distinct from said first and second lens portions, said additional lens portion cooperating with said first lens portion to define indicia having at least two distinct shades.

4. A process for manufacturing an eyeglass lens having indicia thereon comprising:
   (a) masking portions of said lens to leave selected areas of said lens exposed;
   (b) dipping said lenses into a dye of a type which is absorbed into the material of the lens;
   (c) removing said masking to expose undyed portions of the lens which together with the dyed portions of the lens define areas of contrast which form indicia on the lens.

5. A process according to claim 4 wherein step (a) comprises masking complementary portions of a lens on the opposite sides thereof such that areas are defined which are clear entirely through the lens.

6. A process according to claim 4 wherein said masking of portions of said lens is done with tape.

7. A process according to claim 4 wherein said masking of portions of said lens is done with a removable substance which is applied to said lens as a liquid and which subsequently solidifies into an impermeable removable solid.

8. A process according to claim 4 and including the further steps of re-masking a further portion of said lens, dipping said lens into a dye of a different color than the first-mentioned dye, and removing said masking to produce multicolored indicia on said lens.

* * * * *